Nov. 1, 1938.  T. F. PEARSON  2,134,734
SUCTION GATHERER
Filed April 17, 1935  2 Sheets-Sheet 1

Inventor
Thomas F. Pearson,
John J. V. Armstrong.
Attorneys

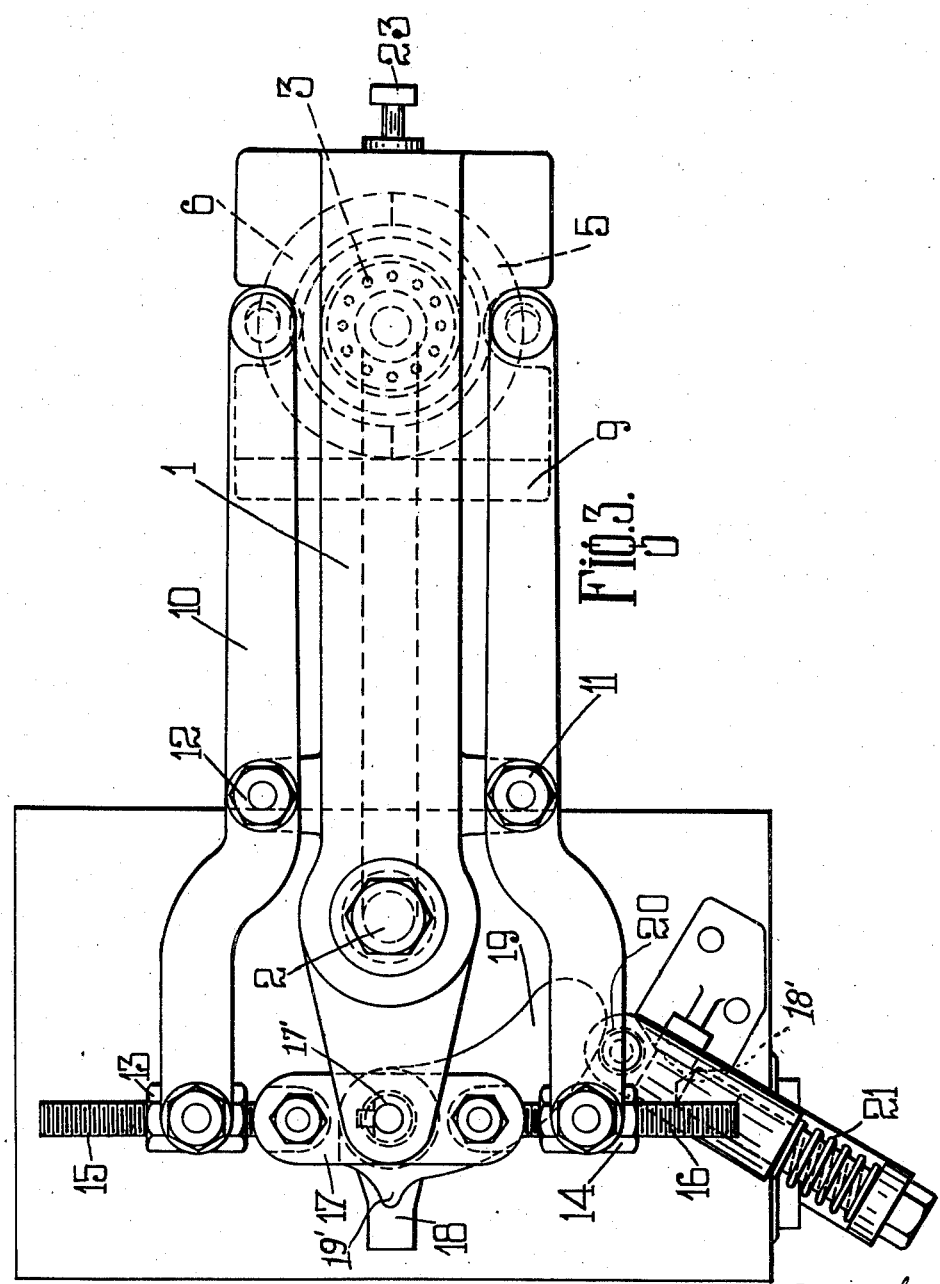

Patented Nov. 1, 1938

2,134,734

UNITED STATES PATENT OFFICE 2,134,734

SUCTION GATHERER

Thomas Finney Pearson, Pontefract, England, assignor to Crown Cork & Seal Co. Inc., New York, N. Y., a corporation of New York Application April 17, 1935, Serial No. 16,920
In Great Britain April 23, 1934

12 Claims. (Cl. 49—62)

This invention relates to an improved suction operated gathering head for picking up a charge of molten glass from a glass furnace and removing it therefrom.

According to the present invention a suction operated gathering head or mould is formed of at least three parts each having a glass retaining surface two of said parts being movable relatively to each other and to the third part which has a recess, the walls of which merge into the walls of the movable parts, when these are in the closed position, so that a glass charge picked up from a glass furnace by suction applied within said gathering head or mould, remains centered by the said recess and is thereby restrained from adhering to one or other of said movable parts as they are displaced away from each other and said recessed part to release their charge.

By this means accurate deposition of a picked up charge of glass metal is possible within a parison or other receiving mould or receptacle outside the furnace.

The invention is more particularly described with reference to the accompanying drawings in which—

Figure 3 is a corresponding plan view.

Figure 1:
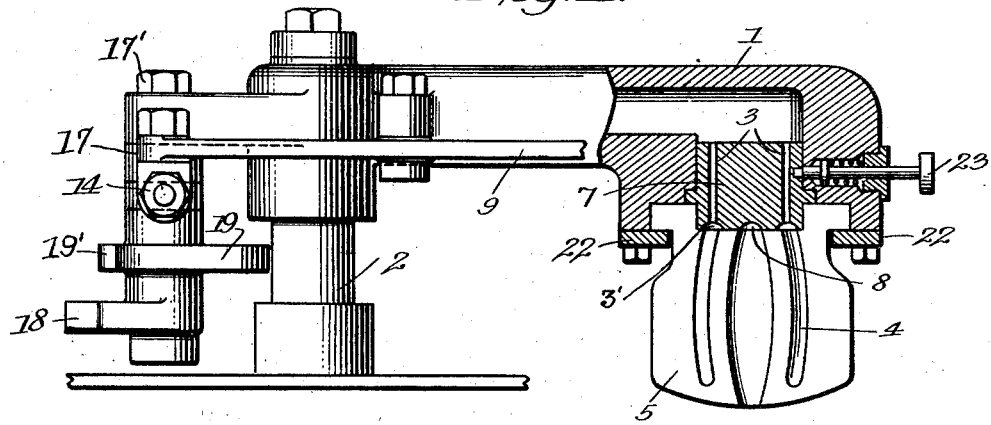
Figure 1 is a side elevation of one form of gathering head, partly in section.

A horizontally disposed arm 1 is supported upon a vertically disposed spindle 2, for swinging movement in a horizontal plane about the axis of the spindle. The spindle and the arm are hollow to form a suction passage from a suitable source to the vertically disposed conduits 3 disposed in a mould part 7 mounted in the downwardly facing open end of the arm 1. The passage 3 communicates with an annular groove 3' on the bottom face of the mould piece 7. This groove, in turn, registers with suction grooves 4, formed on the meeting faces of half mould parts 5, 6. The latter are movable relatively to the mould part 7, which may be made with a central recess 8, the moulding surface of which merges into the side walls of the mould cavity in the parts 5, 6.

Any suitable means may be employed for raising and lowering the spindle 2 and for oscillating the same about its axis. Preferably, the means disclosed in my companion, copending application Serial No. 16,919, filed April 17, 1935, are employed. Reference is hereby made to that application for a disclosure of the means for raising and lowering and swinging the mould supporting arm.

Figure 2:
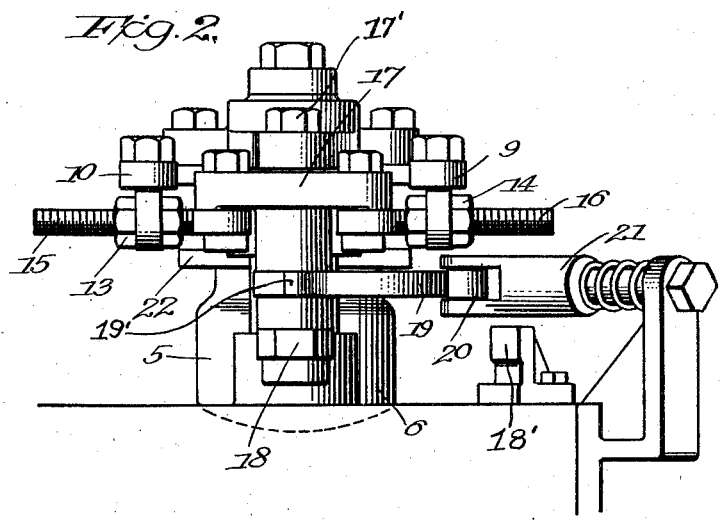
Figure 2 is a corresponding front view.

Each mould part 5, 6 is carried by lever 9, 10, respectively, pivoted at 11, 12 to brackets on the arm 1, the opposite ends of the levers 9, 10 being pivoted to nuts 13, 14 adjustable along threaded links 15, 16. The links are pivoted to a yoke or cross-head 17 keyed with a small degree of lost motion to a vertically disposed bolt 17' carried by the rear end of the arm 1. A rearwardly projecting lug 18 is keyed or otherwise secured against rotation on the bolt 17' at the lower end thereof. A cam piece 19 is secured in similar manner to the bolt 17' above the lug 18, as shown in Figures 1, 2 and 3. A spring-pressed plunger 21, supported adjacent the rear end of the arm 1 carries a roller 20 which engages the cam 19. As shown in Figures 2 and 3, this plunger urges the cam 19 and the yoke or cross-head 17 in a counter-clockwise direction, so that the toggle connection comprising links 15, 16 and yoke 17 between the ends of the levers 9, 10 is in dead center position, whereby locking the mould parts 5, 6 in closed position.

As the arm 1 is swung in a counter-clockwise direction (Fig. 3) by the aforesaid oscillation of the spindle 2, the lug 18 will approach a stationary abutment 18', positioned in predetermined relation to the spring-pressed plunger 21. When the lug 18 contacts the stationary abutment 18', the yoke 17 will be relatively moved in a clockwise direction, and this movement will be assisted and accelerated at the critical point as the cam projection 19' snaps past the roller 20 on the spring-pressed plunger. This movement of the yoke 17 will pivot the levers 9, 10 about the pivots 11, 12 to move the mould parts 5, 6 away from each other.

When the parts are in the position shown in Figures 1, 2 and 3, the arm is disposed at one extreme end of its angular oscillation, and is ready to take up a charge of glass in the mould parts 5, 6 and 7, upon the application of suction and as the mould is lowered onto the surface of molten glass in a forehearth or the like.

After the mould cavity has been filled, the spindle 2 is raised to bring the mould parts out of the pool of glass, and then the spindle and the horizontal arm are swung in a counter-clockwise direction from the position shown in Figure 3 to bring the mould or gathering head clear of the furnace. Toward the end of this oscillation, the levers 9, 10 are displaced about their pivots to open the mould sections 5, 6 as described above. The gathered charge remains centered in the recess 8 and does not tend to move with either one or the other of the sections 5, 6, but drops vertically downwards into a receiving parison mould or other receiving apparatus. In accordance with conventional practice, appropriate shears may be used to sever the thread of glass connecting the mould charge with the pool, after the mould has been raised.

The total angularity of movement of the arm 1 need not exceed 60°.

The mould parts 5, 6 are detachably secured on the ends of levers 9, 10 and are guided by plates 22 on the end of the arm, whilst the mould part 7 is interchangeable therein by withdrawing the spring controlled locking pin 23.

Certain features of the machine of this application are claimed in my copending application Serial No. 16,919, filed April 17, 1935; particularly the means for raising and lowering and for oscillating the suction gathering head.

I declare that what I claim is:

1. A gathering head for gathering and delivering glass charges from a glass furnace comprising a horizontal swinging arm mounted for oscillations about a vertical axis and having a suction passage therein, and a constantly vertically disposed suction gathering mold at the free end of said arm, said mold comprising a pair of mold parts having vertical meeting surfaces relatively movable to one another and the free end of said arm to open and close the mold, and a third mold part rigidly mounted on said arm and recessed to receive part of the charge and to maintain the same in vertical disposition when the other two parts of the mold move away from one another and from the said third part.

2. A gathering head for gathering and delivering glass charges from a glass furnace, comprising a horizontal swinging arm mounted for oscillation about a vertical axis and having an air passage therein, a mould part fixedly mounted on the free end of said arm and having a recess therein having its edges adjacent its open side disposed in a horizontal plane, and a pair of mould parts pivoted to said arm on vertical axes and displaceable in a horizontal plane relative to said fixed mould part, to the arm and to one another, said mould parts serving to define a mould cavity and having air ducts therein adapted to effect a flow of air from said mould cavity to said air passage in said arm.

3. A suction gatherer comprising a horizontally swingable arm, a gathering head carried by the free end of said arm, said head comprising a pair of mold sections pivoted to said arm and movable with respect to each other and to said arm and a third mold section immovably mounted on said arm and defining the upper end of the mold cavity in said head, and means actuated automatically by the swinging movement of said arm to move said movable sections apart to discharge a formed gather, said third mold section serving to maintain said gather centered with respect to said arm during such movement of the movable sections.

4. A suction gatherer comprising a horizontal arm mounted for oscillation about a vertical axis and having a gathering head adjacent its free end, said head comprising a fixed mold having a central recess adapted to form the upper end of the mold cavity of said head, and a pair of laterally movable mold sections having surfaces shaped to merge with said recess and to form the side walls of the mold cavity, and means actuated automatically by the oscillation of said arm for moving said movable mold sections apart, said means comprising a pair of levers pivoted to said arm, links connecting the ends of said levers remote from the mold sections, and an abutment adapted to displace said links at a predetermined point in the oscillation of said arm to rock said levers and open the mold sections.

5. A suction gatherer comprising a horizontally disposed arm mounted for oscillation about a vertical axis, said arm having an air passage therein terminating adjacent the free end in a downwardly facing opening, and a suction gathering mold carried by said arm adjacent the free end thereof, said mold comprising a fixed mold part disposed in said opening and having an air passage therein, and a pair of movable mold parts pivoted to said arm for swinging movement in horizontal planes to open and closed positions, said mold parts having surfaces shaped to define a mold cavity and the movable mold parts having passages cooperating with the air passage in said fixed mold part to facilitate the application of suction from said arm to said mold cavity.

6. A suction gathering mould comprising a relatively fixed upper mould part having a central recess adapted to form the upper end of the gather, the margins of said recess being disposed on a horizontal plane surface of said part, and a pair of relatively movable mould parts having mould cavities adapted to form the sides of the gather, said movable mould parts being mounted for swinging movement toward and from the fixed mould part to close and open the mould, the upper edges of the mould cavities in said movable mould parts being disposed on horizontal plane surfaces of said parts adapted to register with said surface of the fixed mould part when closed.

7. A suction gatherer comprising a substantially horizontal arm mounted for swinging movement about a vertical axis between a gathering position and a gather discharging position, a gathering mould at the free end of the arm, and means for opening and closing the mould, said means comprising a pair of levers pivoted to said arm and extending rearwardly from the free end thereof past said vertical axis, means connecting the rear ends of the levers, and a stationary abutment positioned to be engaged by a part associated with said means connecting the ends of the levers as said arm approaches said discharge position to actuate the levers and thereby open said mould.

8. A suction gatherer comprising a substantially horizontal arm mounted for swinging movement about a vertical axis between a gathering position and a gather discharging position, a gathering mould comprising a pair of movable mould parts at the free end of the arm, means adjacent the other end of the arm for opening and closing the mould comprising a pair of levers connected to the mould parts and a movable abutment and linkage assembly connected between the ends of the levers and pivoted to the arm at said last mentioned end thereof, and a stationary abutment positioned to be engaged by said movable abutment as said arm approaches said discharge position, to cause said assembly to actuate the levers upon continued swinging movement of the arm and thereby open said mould.

9. A suction gatherer comprising a horizontal arm mounted for oscillation about a vertical axis, a pair of movable mould sections, levers pivoted to said arm and connected to said sections, a yoke disposed between the opposite ends of said levers and pivoted to said arm, links connecting the ends of the levers to said yoke, resilient means tending to pivot the yoke in one direction to bring the yoke and links in alignment and lock the mould sections in closed position, and a stationary abutment adapted to engage a part associated with said yoke to pivot the same in the opposite direction upon the oscillation of said arm to a predetermined position to open said mould sections.

10. A suction gather comprising a horizontal arm mounted for oscillation about a vertical axis, a pair of movable mould sections, levers pivoted to said arm and connected to said sections, a yoke disposed between the opposite ends of said levers and pivoted to said arm, links connecting the ends of the levers to said yoke, abutment means associated with said yoke, and a stationary cooperating abutment adapted to engage said abutment means and oscillate said yoke upon oscillation of said arm to a predetermined position, to pivot said levers and open said mould sections.

11. A suction gatherer comprising a horizontal arm mounted for swinging movement on a vertical axis, a pair of levers pivoted to said arm and carrying movable mould halves, a yoke pivoted to said arm and disposed between the levers, means connecting the levers and the yoke, a cam piece carried by the yoke, a spring-pressed plunger engaging the cam piece and tending to pivot the yoke and the levers to maintain the mould parts in closed position throughout a predetermined portion of the swinging movement of said arm, and abutment means associated with said yoke for pivoting the same in the opposite direction to open the mould parts after the arm has been swung to a predetermined discharge position.

12. A suction gatherer comprising a horizontal arm mounted for swinging movement on a vertical axis, a pair of levers pivoted to said arm and carrying movable mould halves, a yoke pivoted to said arm and disposed between the levers, means connecting the levers and the yoke, a cam piece carried by the yoke, a spring-pressed plunger engaging the cam piece and tending to pivot the yoke and the levers to maintain the mould parts in closed position throughout a predetermined portion of the swinging movement of said arm, said cam piece having a projection engageable with said plunger at the end of said portion of swinging movement of the arm for pivoting the yoke in the opposite direction to open the mould parts after the arm has been swung to a predetermined discharge position.

THOMAS FINNEY PEARSON.